United States Patent [19]
Hull

[11] Patent Number: 5,761,538
[45] Date of Patent: Jun. 2, 1998

[54] METHOD FOR PERFORMING STRING MATCHING

[75] Inventor: Richard Hull, Bristol, England

[73] Assignee: Hewlett-Packard Company, Palo Alto, Calif.

[21] Appl. No.: 499,967

[22] Filed: Jul. 10, 1995

[30] Foreign Application Priority Data

Oct. 28, 1994 [EP] European Pat. Off. ............ 94307977

[51] Int. Cl.$^6$ .............. G06K 9/72; G06K 9/00; G06F 19/00
[52] U.S. Cl. ................... 395/899; 364/400; 382/186; 382/187; 382/229
[58] Field of Search .................. 364/400; 382/185, 382/186, 187, 217, 218, 219, 229; 395/603, 899

[56] References Cited

U.S. PATENT DOCUMENTS

| | | | |
|---|---|---|---|
| 3,108,254 | 10/1963 | Dimond | 382/187 |
| 3,111,646 | 11/1963 | Harmon | 382/186 |
| 3,127,588 | 3/1964 | Harmon | 382/186 |
| 3,133,266 | 5/1964 | Frishkopf | 382/186 |
| 3,200,373 | 8/1965 | Rabinow | 382/217 |
| 5,148,541 | 9/1992 | Lee et al. | 395/602 |
| 5,313,527 | 5/1994 | Guberman et al. | 382/186 |
| 5,434,932 | 7/1995 | Scott | 382/229 |
| 5,459,739 | 10/1995 | Handley et al. | 371/36 |
| 5,467,407 | 11/1995 | Guberman et al. | 382/186 |
| 5,553,272 | 9/1996 | Ranganathan et al. | 395/500 |

FOREIGN PATENT DOCUMENTS 0031493   7/1981   European Pat. Off.

OTHER PUBLICATIONS

Pattern Recognition, vol. 26, No. 3, 1993, pp. 451–460, XP367317 P. Morasso et al. 'Recognition experiments of cursive dynamic handwriting self-organizing networks' Section "2 Preprocessing" *figure 1*.

Int. Neural Network Conf., vol. 1, 9 Jul. 1990, Paris FR, pp. 141–144, XP145245,P.Morasso et al. 'Self-organization of an allograph lexicon' Section"1. Introduction" Section 2.1 Segmentation module.

(List continued on next page.)

*Primary Examiner*—Edward R. Cosimano

[57] ABSTRACT

An improved method of matching a query string against a plurality of candidate strings replaces a highly computationally intensive string edit distance calculation with a less computationally intensive lower bound estimate. The lower bound estimate of the string edit distance between the two strings is calculated by equalising the lengths of the two strings by adding padding elements to the shorter one. The elements of the strings are then sorted and the substitution costs between corresponding elements are summed.

19 Claims, 8 Drawing Sheets

OTHER PUBLICATIONS

Information Theory, 29 Aug. 1960, London GB, pp. 300–316, L.S. Frishkopf et al, 'Machine reading of cursive script' *p. 301, line 27–line 29* pp. 300–316.

Daniel P. Lopresti & Andrew Tomkins. "Pictographic naming." Technical Report 007–mei–pti–mitl–228–1.Matsushita Information Technology Laboratory, Princeton, Nov., 1992.

Daniel P. Lopresti & Andrew Tomkins. "A comparison of techniques for graphical database queries." Technical Report MITL–TR–45–93.Matsushita Information Technology Laboratory,Princeton, May, 1993.

Thierry Paquet & Yves Lecourtier. "Recognition of handwritten sentences using a restricted lexicon." Pattern Recognition. 26(3);391–407, 1993.

Pattern Recognition, vol. 26, No. 3, 1993, pp. 391–407, XP367312, T Paquet et al, 'Recognition of handwritten sentences using a restricted lexicon' p. 401 Section "4.3.2 Normalizing the editing costs".

1990 IEEE Int. Conf. on Systems, Man and Cybernetics, 4 Nov. 1990, Los Angeles, CA, pp. 835–838, XP215462, D.W. Fincher et al, 'Multi–sensor data fusion using neural networks' *p. 836, left column, line 41–line 55; figure 5*.

Pattern Recognition, vol. 7, No. 24, pp. 711–716, XP 000228850 Shufen Kuo, et al 'A Two–Step String–Matching Procedure*' *paragraphs 3.1, 5.1, 5.2*.

ICASSP–93: IEEE International Conference On Acoustics, Speech, And Signal Processing, Apr. 1993 Minneapolis, Minnesota, US, pp. 645–648, XP 000399204 Quen–Zong Fu, et al. A New Stroke String Matching Algorithm—*abstract*.

$a_1$      $b_1$ $b_2$      $a_2$      $del(a_1), sub(b_1,b_2), ins(a_2)$ $a_1$      $b_1$ $b_2$      $a_2$      $ins(b_2), sub(a_1,a_2), del(b_1)$ $a_1$      $b_1$ $b_2$      $a_2$      $del(a_1), del(b_1), ins(b_2), ins(a_2)$

Fig. 5A $a_1$      $b_1$ $b_2$      $a_2$      $sub(a_1,a_2), sub(b_1,b_2)$

Fig. 5B

| | | |
|---|---|---|
| $c_1$ | 20, 16, -12,  3, -1, 18 | STRINGS |
| $c_2$ | -4, 12,  19, -6, -2 | |
| $c_1$ | 20, 16, -12,  3, -1, 18 | PADDING |
| $c_2$ | -4,  12,  19, -6, -2,  0 | |
| $c_1$ | -12, -1,  3, 16, 18, 20 | SORTING |
| $c_2$ | -6, -4, -2,  0, 12, 19 | |

$s(-12,-6) + s(-1,-4) + \ldots + s(20,19)$   SUM SUBSTITUION COSTS

Fig. 7

METHOD FOR PERFORMING STRING MATCHING

TECHNICAL FIELD

The present application relates to the general field of string matching and more particularly to a method of string matching using a lower bound estimate of the string edit distance.

BACKGROUND ART

String matching is the comparison of two strings in order to determine how closely they resemble each other. A commonly used measure of string resemblance is "string edit distance". In simple terms, the string edit distance measures the "cost" of editing one string such that it becomes the other. String edit distance will be explained in more detail in the description.

The most commonly used method for computing string edit distances is called "dynamic programming". The exact nature of dynamic programming is known and will not be described in detail in this application. Dynamic programming and all such string edit distance algorithms are computationally intensive. In commercial devices, computing resources are always limited by cost so it is desirable to reduce as much as possible the computational requirements of application programs: this is often crucial in order to keep response times to user input within acceptable levels.

A device having a limited processing capability and running a string matching application is the "scribble matching" device described in European application no. 94304890 by the same applicant. "Scribble matching" is the operation of searching samples of electronic ink, "scribbles", without first having to translate them into ASCII text. A scribble is entered by the user writing directly on a screen using an electronic stylus. Here string matching is used to compare a string representing an input scribble, the query string, with strings representing a series of previously entered scribbles, the candidate strings. The purpose of the matching operation is to recover a data object (e.g. a telephone number) associated with one of the candidate strings. A decrease in the response time to user input could be obtained in this device if the processing requirement for calculating string edit distances could be reduced.

String edit distances are also used in many other string matching applications. Many commercial word-processors employ string edit distance calculations as do DNA comparison programs. In the latter case, the candidate strings may be sub-strings of a single "long" candidate string. Both of these applications would benefit from a reduction in the amount of computation required to perform the string matching.

It is therefore an object of the invention to provide an improved method of string matching.

DISCLOSURE OF INVENTION

According to the present invention we provide a method for matching a query string against a candidate string, the method comprising calculating a lower bound estimate of the string edit distance for the candidate string where calculating the lower bound estimate comprises the steps of:

- equalising the lengths of the two strings by adding padding elements to the shorter string;
- sorting the two strings according to the values of their internal elements;
- calculating the sum of the substitution costs of the elements in corresponding positions in the two strings.

This method has the advantage that it has a lower processing requirement than prior art string matching methods.

In a first embodiment of the invention, the string matching operation comprises the steps of:

- calculating a string edit distance between the query string and one of said candidate strings and storing said candidate string as the current best match string;
- calculating a lower bound estimate distance for each of the remaining candidate strings and evaluating the results such that:
  - if the lower bound estimate distance is greater than the current best match distance the candidate string is discarded;
  - otherwise calculating the string edit distance between the query string and the current candidate string and retaining the current candidate string or the current best match string, whichever has the lower string edit distance from the query string, as the current best match candidate string;
- storing the final best match candidate string.

In a second embodiment of the invention the string matching operation is made more efficient by carrying out an initial step of calculating the lower bound estimate distance from the query string for each of the candidate strings and ordering the candidate strings according to lower bound distance; then discarding all candidate strings whose lower bound estimate distance from the query string exceeds the current best match distance.

In a third embodiment the method of the invention comprises the further step of discarding all of said candidate strings having lower bound estimate distances greater than a predefined threshold distance before performing the first string edit distance calculation.

BRIEF DESCRIPTION OF DRAWINGS

Particular embodiments of the present invention in the field of scribble matching will now be described by way of example with reference to the following figures:

FIG. 5A shows the legal string edit sequences for mapping a first two character string to second two character string;

FIG. 5B shows an illegal string edit sequence using "crossovers";

FIG. 7 is an example of the calculation of a lower bound estimate distance for two integer code strings;

BEST MODE FOR CARRYING OUT THE INVENTION & INDUSTRIAL APPLICABILITY

Figure 1:
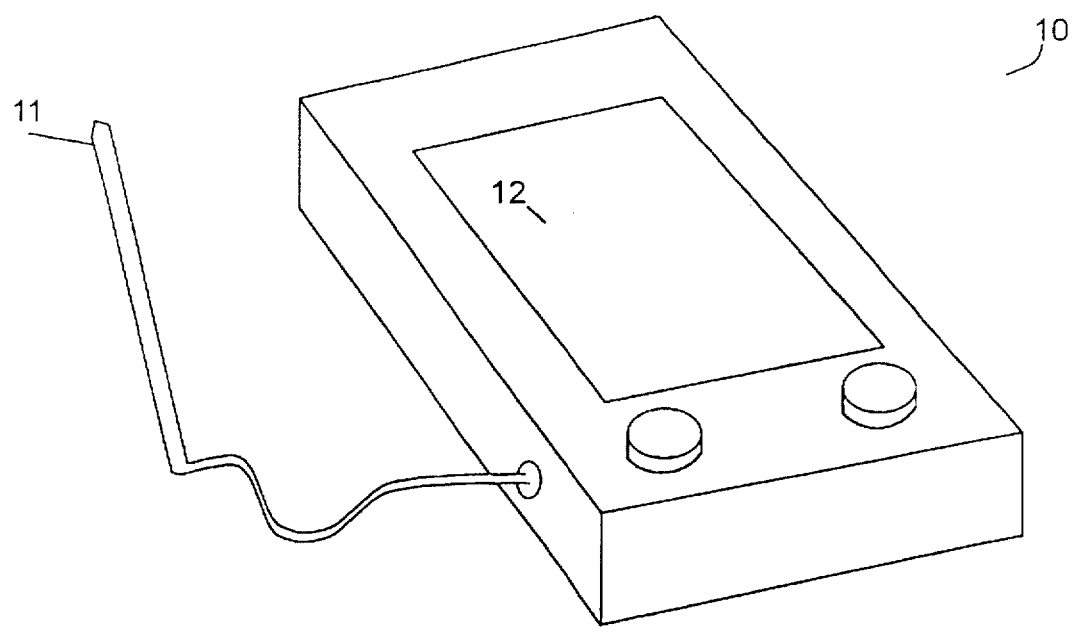
FIG. 1 shows an example hand-held scribble-matching device employing lower bound estimates of string edit distances according to the present invention.

In FIG. 1 a hand-held "scribble matching" device 10 is shown as an example of a device having limited processing power and in which the present invention can be used to reduce computation time.

Device 10 comprises a pen-sensitive screen 12 and a stylus 11 for writing on the screen. The device contains a microprocessor, such as the Intel 80386, for carrying out general control functions such as initialisation. The device also contains a processor based string matching subsystem 20 which matches telephone numbers and names against encoded scribbles entered by writing on the screen 12 with the stylus 11.

Figure 2:
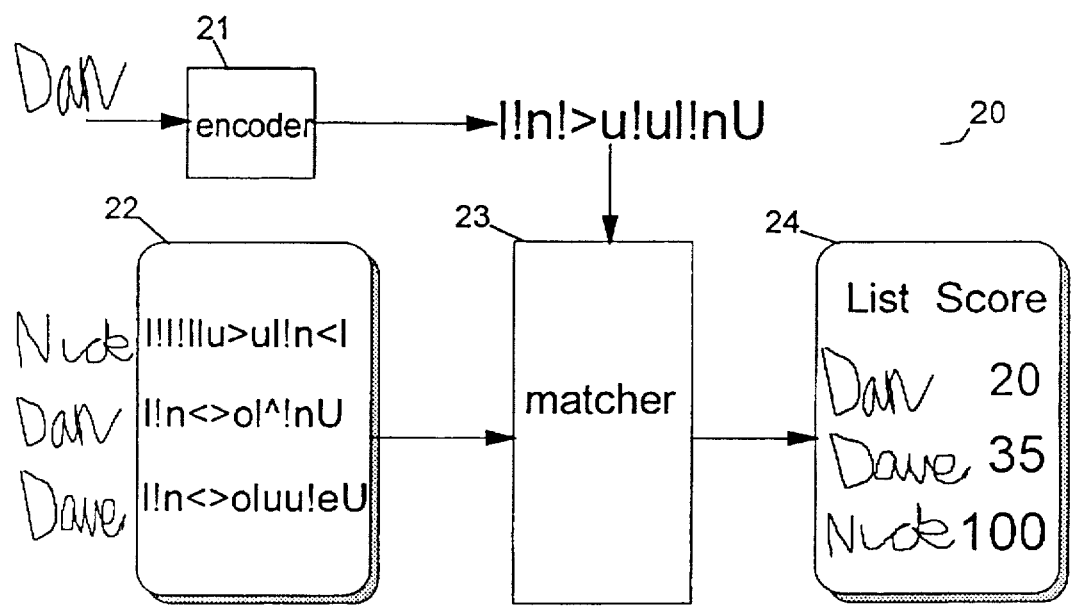
FIG. 2 is a simplified block diagram of the scribble matching sub-system of the device of FIG. 1.

The scribble matching subsystem 20 is now described in more detail with reference to FIG. 2. The scribble matching subsystem consists of an encoder 21 which computes a query string representation of an input scribble. This query string is passed to the matcher 23 which computes the string edit distances between it and a set of previously stored candidate strings 22. "Distance scores" are calculated for each of the candidate strings 22 relative to the query string and the results 24 are used to determine the best match. In FIG. 2 the name "Dan" is matched with the candidate string corresponding to "Dan" since the distance score is lowest between these two strings. This candidate string is returned as the best match with its associated telephone number.

The encoding phase of the scribble matching operation is not the subject of the present invention and will not be described in detail.

Figure 3:
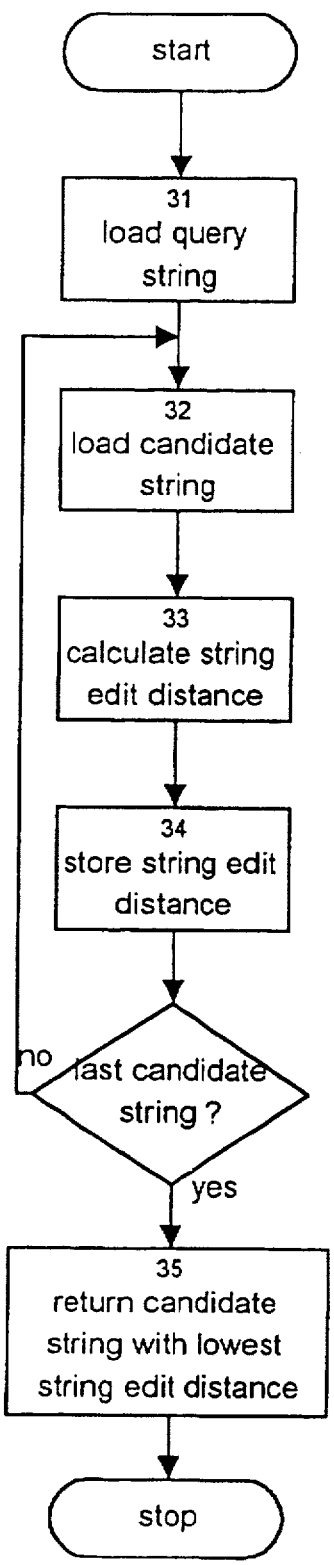
FIG. 3 is a flowchart of a conventional string matching method.

A description of a conventional matching operation will now be given with reference to the flowchart in FIG. 3 which shows the following steps:

Step 31: the encoded query string is loaded into the matcher;
Step 32: the first candidate string is loaded;
Step 33: the string edit distance between the two strings is calculated using a computationally intensive technique such as dynamic programming and stored;
Step 34: the string edit distance is stored;
Steps 32-34 are repeated for the second and subsequent candidate strings until all of the candidate strings have been processed;
Step 35: the candidate string having the lowest string edit distance from the query string is returned as the best match.

In this conventional approach, calculation of the string edit distance must be performed for each of the candidate strings giving rise to a very high overall computation requirement.

Figure 4:
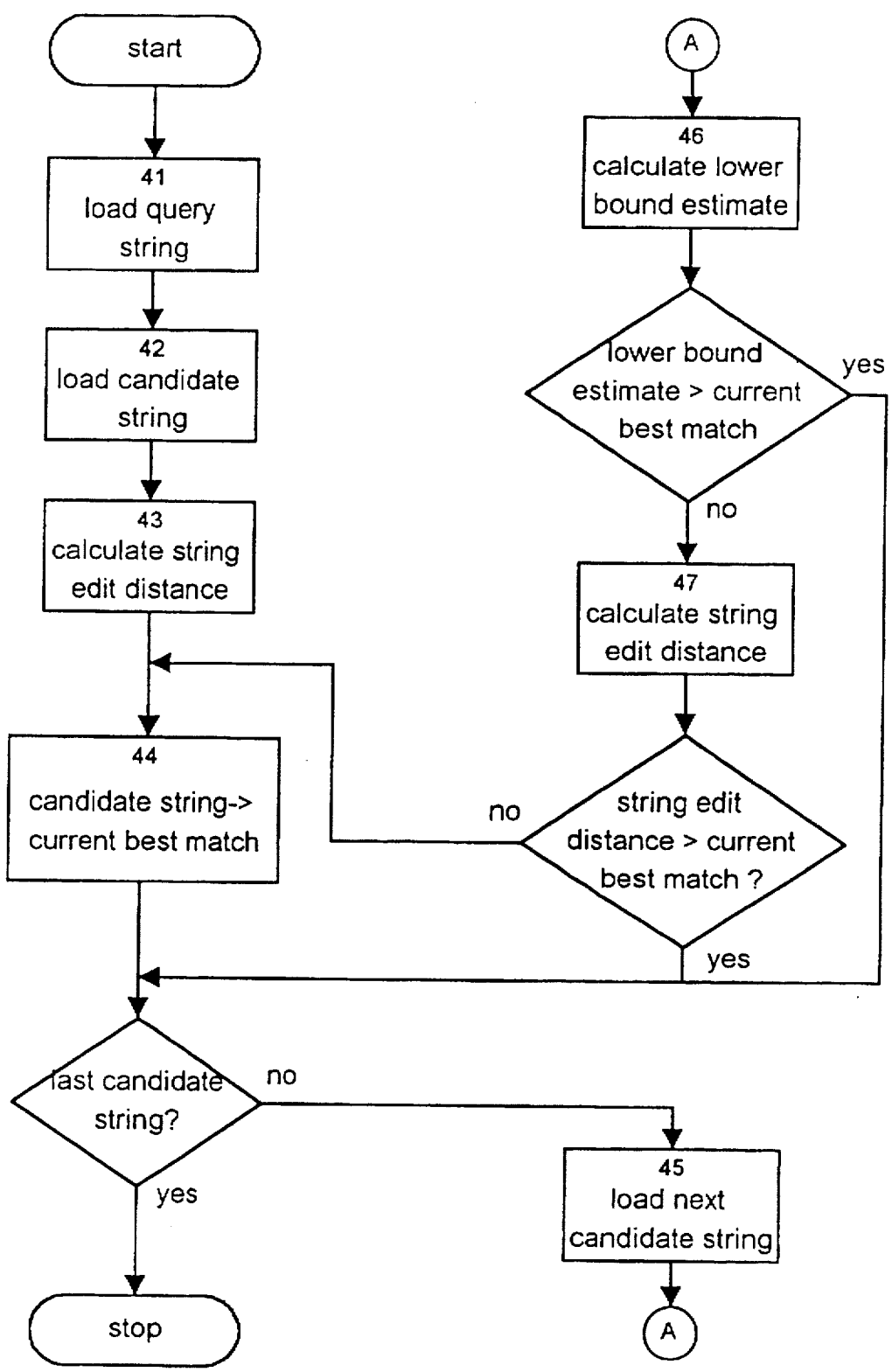
FIG. 4 is a flowchart showing a string matching method utilising the present invention.

In FIG. 4 an improved string matching method utilising the present invention is outlined. This embodiment involves replacing, where possible, the highly computationally intensive string edit distance calculation with a less computationally intensive "lower bound estimate distance" calculation. The lower bound estimate distance is an approximation to the string edit distance, guaranteed not to exceed the magnitude of the string edit distance which it approximates. It is far less computationally intensive to calculate than the string edit distance. It follows that if the calculated lower bound estimate distance is greater than the string edit distance of a current best match, it is no longer necessary to calculate the actual string edit distance for this candidate string. This is true because the actual string edit distance must always be greater than or equal to its lower bound estimate distance. Thus in FIG. 4:

Step 41: the query string is loaded;
Step 42: the first candidate string is loaded;
Step 43: string edit distance is calculated between the query string and first candidate string;
Step 44: this candidate string is then stored as the current best match;
Step 45: the next candidate string is loaded;
Step 46: the lower bound estimate distance is calculated between it and the query string; if the lower bound estimate is greater than the string edit distance of the current best match the candidate string can be eliminated immediately and the next candidate string loaded in step 45.
Step 47: if the lower bound estimate distance is less than the string edit distance of the current best match then the string edit distance of the candidate string must be calculated.

When the lower bound estimate is less that the current best match string edit distance, the string edit distance for the candidate string must be calculated in order to make a meaningful comparison between the current best match and the candidate string.

If string edit distance of the candidate string is less than that of the current best match the method branches back to step 44 and the candidate string becomes the current best match.

Otherwise, the candidate string can be discarded and the next candidate string loaded in step 45.

The method repeates until all of the candidate strings have been processed.

This method is guaranteed to find the best matching string from the set of candidate strings.

From the preceding description it is necessary that, to be an effective rejection criterion, the lower bound estimate should closely underestimate but never exceed the actual string edit distance. In theory there are many ways to calculate a lower bound estimate to the string edit distance. An example of a lower bound estimate is "0" which is a lower bound for all string edit distances. However, "0" is not a good estimate of the string edit distance since it would not be an effective rejection criteria. We provide a method of calculating a lower bound estimate which provides a very close approximation to the string edit distance but which is far less computationally intensive.

A better understanding of the invention is facilitated by a more detailed explanation of string edit distance.

A "string edit sequence" transforms one string to another through a series of "substitutions" (sub), "deletions" (del) and "insertions" (ins). FIG. 5A shows an example in which a two character string is mapped to a second two character string using legal string edit sequences. In the figure string $a_1b_1$, can be mapped onto string $a_2b_2$ through one of three legal edit sequences:

1. $del(a_1),sub(b_1,b_2)ins(a_2)$
2. $del(b_2),sub(a_1,a_2),ins(b_1)$
3. $del(a_1),del(b_1),ins(b_2),ins(a_2)$ Where sub(a,b) is the substitution of a with b.

Each of the three edit operations is assigned a "cost". The choice of costs is purely application dependent and is made by the system designer. The "string edit distance" is then defined as the minimum sum of the costs of the edit operations required to transform one string into the other. If insertion and deletion costs are chosen to be uniform i.e. the cost of insertions equals the cost of deletions; and the substitution cost is chosen to be symmetrical i.e. the cost of sub(a,b) equals the cost of sub(b,a), and is chosen to be less than an insertion cost plus a deletion cost; the string edit distance in FIG. 5A will be the overall cost of either of the sequences 1 or 2 above.

For the simple case of FIG. 5A, the minimum cost string edit sequences 1 and 2 are easy to identify. In real applications, however, where longer strings are involved and the edit costs are assigned in a more sophisticated manner, finding minimum cost string edit sequences becomes more complicated. In order to find the minimum sum, dynamic programming is used to consider the costs of all possible legal string edit sequences.

FIG. 5b shows a fourth possible string, edit sequence using the crossover substitutions sub($a_1, a_2$), sub($b_1, b_2$). This string edit sequence has a lower overall cost but can not be permitted. The prohibition of crossover substitutions is a prerequisite to the use of dynamic programming. If crossovers were allowed, for example to handle transpositions in typed words, then the search for the minimum cost string edit sequence would be greatly complicated and an even more computationally intensive algorithm than dynamic programming would have to be applied.

The lower bound estimate distance of the invention relaxes the crossover constraint and uses crossovers to allow each element in a string to be substituted, if possible, by an element from the other string. However, the lower bound estimate computation does not search for all possible combinations of crossover substitutions. Rather, a procedure is used to determine the crossovers to be used, based on an ordering of the two strings. The resulting, cost is guaranteed to be less than the corresponding string edit distance.

In the following discussion s( ) denotes the cost of substitution, i( ) the cost of an insertion and d( ) the cost of a deletion.

The lower bound estimate distance algorithm makes five assumptions:

1. The strings x, y consist of sequences of elements drawn from a set, S, like the set of integers, which has a total order.

2. All edit operation costs on elements $x_i, y_i \in S$ are greater than or equal to zero i.e.

$$s(x_i, y_j) \geq 0$$

$$i(x_i) \geq 0$$

$$d(x_i) \geq 0$$

3. The cost of substituting two elements is less than or equal to the cost of inserting one and deleting the other i.e.

$$s(x_i, y_j) \leq i(y_j) + d(x_i)$$

4. There is a null value $\phi$, for elements such that the cost of substituting an element $x_i$ with $\phi$ less than or equal to the cost of inserting or deleting $x_i$ i.e.

$$s(x_i, \phi) \leq d(x_i)$$

and $$s(\phi, x_i) \leq i(x_i)$$

Furthermore, if it is required that the string edit distance and its lower bound be symmetric in the order of the two strings, 5. Edit: operation costs should be symmetric.

$$i(x_i) = d(x_i)$$

and $$s(x_i, y_j) = s(y_j, x_i)$$

Figure 6:
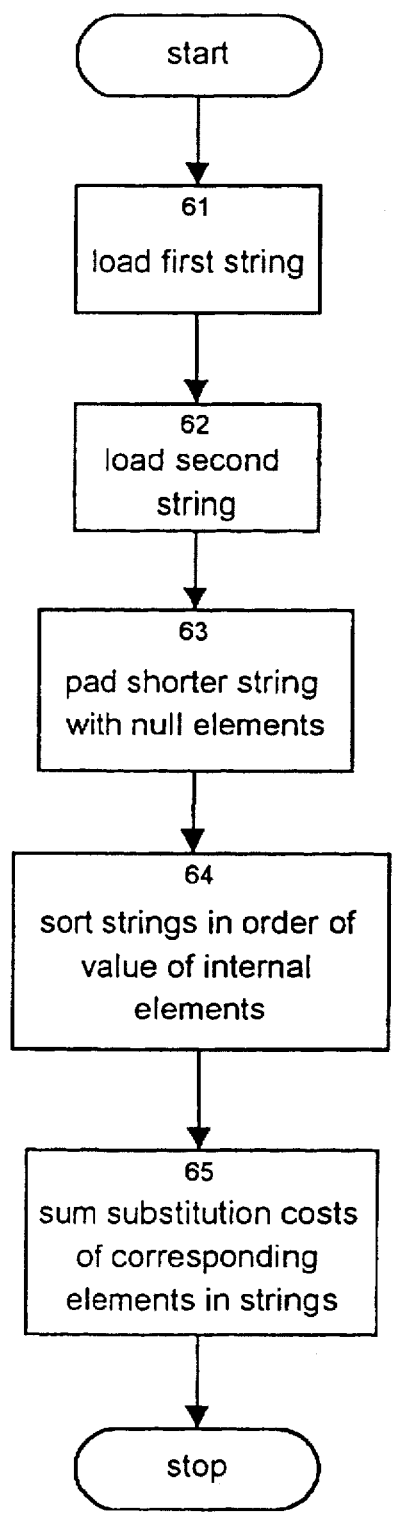
FIG. 6 is a flowchart showing an algorithm for computing the lower bound on the string edit distance according to the invention.

The algorithm for calculating a lower bound estimate of the string edit distance is shown in the flowchart of FIG. 6.

The strings are loaded in steps 61 and 62. In step 63 the string lengths are equalised by adding padding (null) elements to the shorter string. In step 64 both strings are sorted in the order of the internal elements. The sum of the substitution costs of the elements in the corresponding positions of the strings is then calculated in step 65.

This method is much less computationally expensive than dynamic programming.

An example of the application of this algorithm to two integer code strings with the following costs is given in FIG. 7.

$$s(x_i, y_j) = |x_{i-y_j}|$$

$$d(x_i) = |x_i|$$

$$i(y_j) = |Y_j|$$

$$\phi = 0$$

Applying the method of FIG. 6: string $c_2$, is padded with null elements. Having been equalised both strings are sorted, in this case in ascending order. The sum of substitution costs of corresponding elements is calculated which for integers is simply the sum of the magnitudes of the distances between them.

It will be clear to the person skilled in the art that the improvement offered by applying the invention to the string matching algorithm of FIG. 4 depends to a great extent on the order in which the candidate strings are processed. In the worst case the candidate strings would be arranged in descending order of string edit distance. Then for each candidate string both a lower bound estimate distance and a string edit distance would have to be calculated, resulting in a processing requirement in excess of the conventional requirement. However, in a real device this situation would not occur frequently making it possible to state that on average a string matching algorithm using the invention to estimate string edit distance performs less overall processing than the conventional algorithm.

Figure 8:
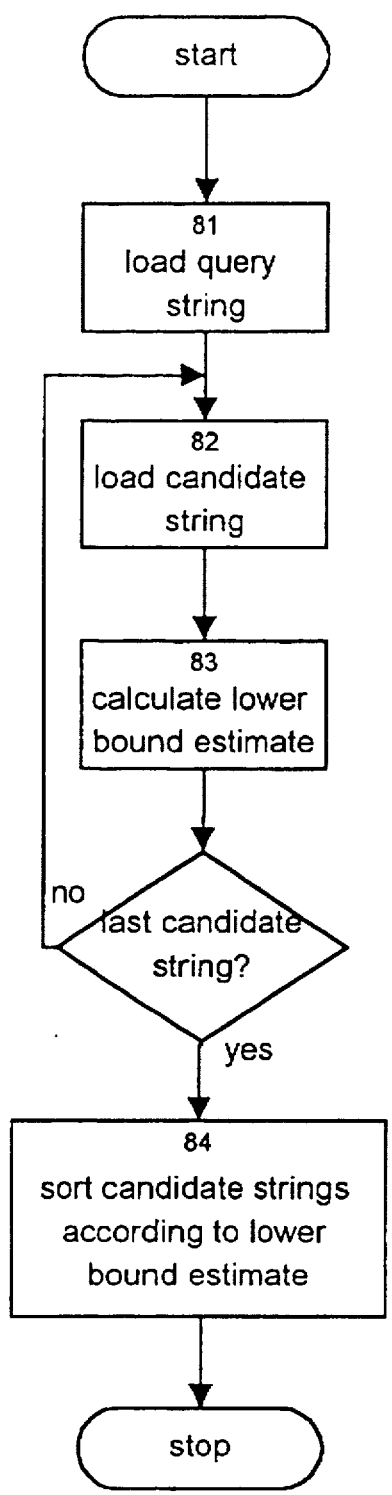
FIG. 8 is a flowchart of a second application of the method of the present invention further improving the string matching operation.

The invention can be further applied to solve the ordering problem as shown in FIG. 8. In the figure, the lower bound estimate distances are calculated for each of the candidate strings in a pre-processing steps 81–83 and the candidate strings are sorted in ascending order of their lower bound estimate distances step 84. The method then proceeds according to FIG. 4. This improvement not only eliminates the worst case ordering described above but also reduces the processing requirement still further. This is because all remaining candidates can be rejected once iteration reaches the first candidate string with a lower bound distance from the query string that exceeds the current best match distance.

Figure 9:
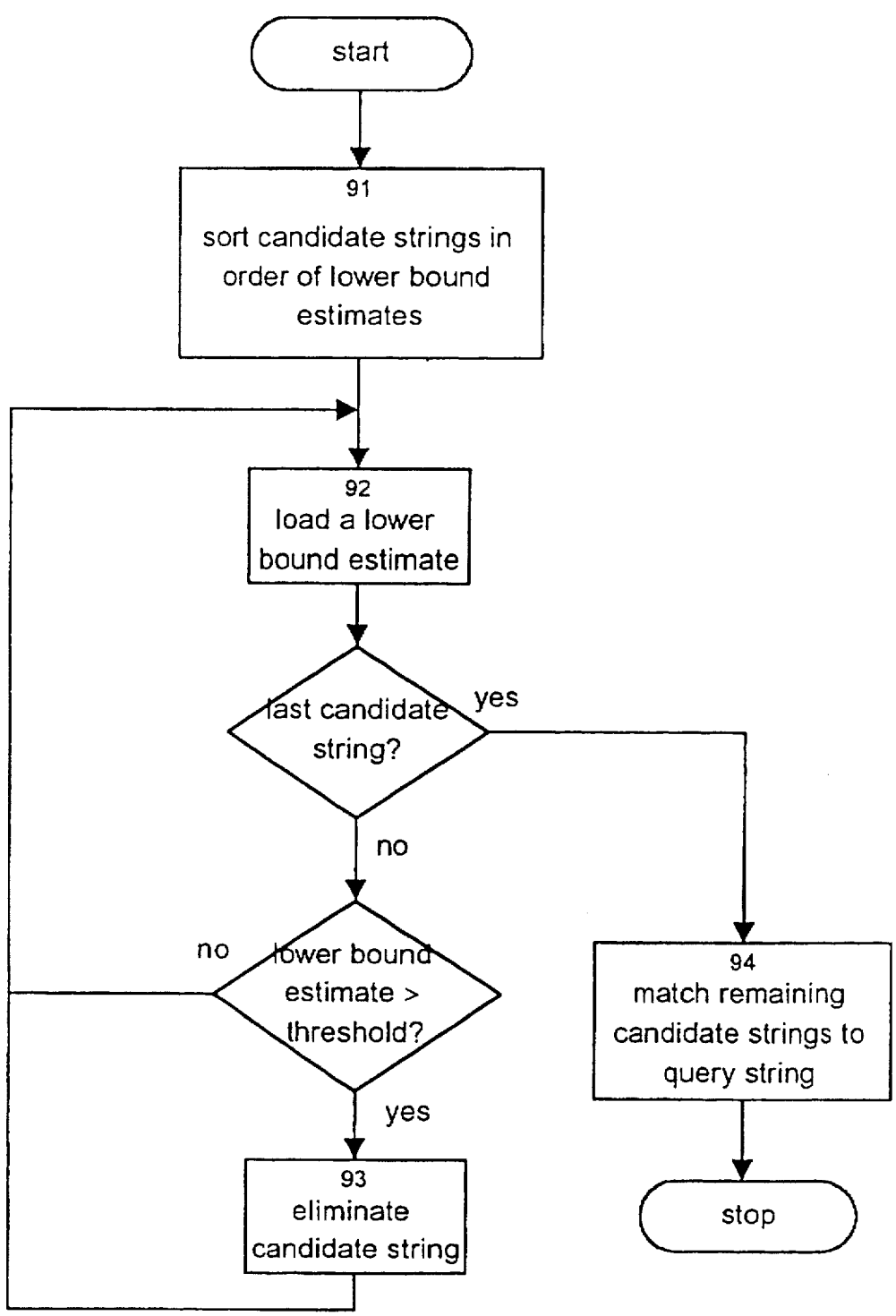
FIG. 9 is a flowchart of a third application of the method of the invention including a thresholding step to further accelerate the calculation.

The flowchart in FIG. 9 shows how a further application of the invention provides an opportunity for further reducing the processing requirement in a string matching application. Here in step 91 the lower bound estimates for each of the candidate strings are calculated and the candidate strings are then sorted into ascending order of their lower bound estimates as in FIG. 8. However, a thresholding operation step 93 is then applied so that all candidate strings with lower bound estimate distances greater than some predefined threshold are immediately discarded. The remaining candidate strings are then matched in step 94 using the method of the invention as previously described in FIG. 4.

The threshold chosen could be some absolute level or may be relative to, for example the lowest lower bound estimate of the set of candidate strings. This heuristic strategy is not guaranteed to find the best matches. The order of lower bound estimate distances does not completely predict the order of string edit distances of candidates to some query string and a heuristic threshold may sometimes eliminate candidate strings having relatively high lower bound estimate distances but which correspond to the minimum cost string edit distances. Nevertheless, the potential advantage of this approach is the possibility of setting an appropriate threshold with an acceptable level of matching error.

Thus the lower bound estimate can be used in a variety of ways to reduce the processing requirement of the string matching operation.

What is claimed is:

1. A method for calculating a lower bound estimate of string edit distance between query string and a candidate string, the method comprising:

equalising lengths of the strings by adding padding elements to a shorter one of the strings;

sorting the query string and the candidate string according to their element values;

calculating a sum of substitution costs of the elements in corresponding positions in the sorted strings, the sum of the substitution costs being the lower bound estimate of string edit distance.

2. A string matching method comprising steps of:

calculating a string edit distance between a query string and one of a plurality of candidate strings and storing said candidate string as a current best match string;

calculating a lower bound estimate distance for each remaining candidate string and evaluating each result such that:

if a lower bound estimate distance is greater than a current best match distance the candidate string from which the estimate was calculated is discarded;

otherwise calculating the string edit distance between the query string and the current candidate string and replacing the current best match string with whichever of the current candidate string and the current best match string has a lower string edit distance from the query string;

storing a final best match string.

3. A method according to claim 2 further comprising an initial step of calculating the lower bound estimate distance from the query string for each candidate string in turn and ordering said candidate strings according to lower bound estimate distance.

4. A method according to claim 3 comprising a further step of discarding all of said candidate strings having lower bound estimate distances greater than a predefined threshold distance before performing a first string edit distance calculation.

5. A scribble matching apparatus in which a query string is matched against a candidate string, the apparatus calculating a lower bound estimate of string edit distance between the strings and comprising:

means for equalizing lengths of the strings by adding padding elements to a shorter one of the strings;

means for sorting the query string and the candidate string according to a value of their elements; and means for calculating a sum of substitution costs of elements in corresponding positions in the sorted strings, the sum of the substitution costs being the lower bound estimate of string edit distance.

6. An apparatus according to claim 5, further comprising:

means for calculating string edit distance between a query string and one of a plurality of candidate strings and for storing said candidate string as a current best match string;

means for calculating said lower bound estimate distance for each remaining candidate string and evaluating results such that:

if a lower bound estimate distance is greater than a current best match distance the candidate string is discarded;

otherwise calculating the string edit distance between the query string and the current candidate string and retaining the current candidate string or the current best match string, whichever has the lower string edit distance from the query string, as the current best match candidate string; and means for storing the final best match candidate string.

7. An apparatus according to claim 6, further comprising:

means for calculating a lower bound estimate distance from the query string for each candidate string in turn; and means for ordering said candidate strings according to lower bound estimate distance.

8. An apparatus according to claim 7, further comprising means for discarding all of said candidate strings having lower bound estimate distances greater than a predefined threshold distance before performing a first string edit distance calculation.

9. A method for matching a query graphical data sample against one or more candidate graphical data samples comprising steps of:

providing each of one or more candidate graphical data samples as a candidate string;

providing the query graphical data sample as a query string; and matching the query string against the one or more candidate strings, wherein this matching comprises sorting of the strings according to their internal element values; characterised in that the step of matching the query string against the one or more candidate strings comprises a step of calculating a lower bound estimate of a string edit distance between the query string and at least one of the candidate strings, wherein the step of calculating the lower bound estimate of the string edit distance between the query string and a candidate string comprises:

equalising string lengths by adding padding elements to a shorter one of the strings;

sorting the strings according to their internal element values;

calculating a sum of substitution costs for elements in corresponding positions in the sorted strings, the sum of the substitution costs being the lower bound estimate of the string edit distance.

10. A method according to claim 9, wherein each of said graphical data samples is a sample of electronic ink.

11. A method according to claim 9, further comprising the steps of:

calculating a string edit distance between said query string and one of said candidate strings and storing said candidate string as a current best match string;

calculating a lower bound estimate distance for each remaining candidate string and evaluating each result such that:

if the lower bound estimate distance is greater than the current best match string edit distance the candidate string is discarded;

otherwise calculating string edit distance between the query string and the current candidate string and replacing the current best match string with the current candidate string or the current best match string, whichever has a lower string edit distance from the query string;

storing a final best match string.

12. A method according to claim 11, wherein each of said graphical data samples is a sample of electronic ink.

13. A method according to claim 11 further comprising an initial step of calculating the lower bound estimate distance from the query string for each of the candidate strings in turn and sorting said candidate strings according to lower bound estimate distance.

14. A method according to claim 13, wherein each of said graphical data samples is a sample of electronic ink.

15. A method according to claim 13 comprising a further step of discarding all of said candidate strings having lower bound estimate distances greater than a predefined threshold distance before performing a first string edit distance calculation.

16. A method according to claim 15, wherein each of said graphical data samples is a sample of electronic ink.

17. A scribble matching device, comprising:

means to enter a query sample of electronic ink;

means to encode an entered query sample of electronic ink as a query string;

means to store candidate electronic ink samples as candidate strings; and a matcher adapted for matching the query string against the one or more candidate strings by a method which comprises a step of calculating a lower bound estimate of string edit distance between the query string and at least one of the candidate strings, wherein the step of calculating the lower bound estimate of string edit distance between the query string and a candidate string comprises:

equalising the string lengths by adding padding elements to a shorter one of the strings;

sorting the strings according to their internal element values;

calculating a sum of substitution costs of elements in corresponding positions in the sorted strings, the sum of the substitution costs being the lower bound estimate of the string edit distance.

18. A scribble matching device as claimed in claim 17, wherein the matcher is adapted for matching the query string against the one or more candidate strings by a method comprising steps of:

calculating a string edit distance between said query string and one of said candidate strings and storing said candidate string as a current best match string;

calculating a lower bound estimate distance for each remaining candidate string and evaluating each result such that:

if the lower bound estimate distance is greater than a current best match distance the candidate string is discarded;

otherwise calculating the string edit distance between the query string and the current candidate string and replacing the current best match string with whichever of the current candidate string and the current best match string has a lower string edit distance from the query string;

storing a final best match string.

19. A device as claimed in claim 18, wherein the matcher is adapted for matching the query string against the one or more candidate strings by a method which further comprises an initial step of calculating the lower bound estimate distance from the query string for each of the candidate strings in turn and sorting said candidate strings acording to lower bound estimate distance.

* * * * *

UNITED STATES PATENT AND TRADEMARK OFFICE
CERTIFICATE OF CORRECTION

PATENT NO : 5,761,538
DATED : June 2, 1998
INVENTOR(S): Richard Hull

It is certified that error appears in the above-identified patent and that said Letters Patent are hereby corrected as shown below:

Claim 1 (Column 7, line 13) insert --a-- before "query".

Signed and Sealed this

Eighth Day of February, 2000

Attest:

Attesting Officer

Q. TODD DICKINSON

Commissioner of Patents and Trademarks